United States Patent

Bowyer et al.

[11] Patent Number: 6,118,975
[45] Date of Patent: Sep. 12, 2000

[54] METHOD AND APPARATUS FOR LEAKAGE DETECTION USING PULSED RF TAGGING SIGNAL

[75] Inventors: Andrew E. Bowyer; Douglas J. Franchville, both of Indianapolis, Ind.

[73] Assignee: Wavetek Wandel Goltermann, Inc., Indianapolis, Ind.

[21] Appl. No.: 08/982,935

[22] Filed: Dec. 2, 1997

[51] Int. Cl.[7] ................................................ H04N 7/16

[52] U.S. Cl. ............................. 455/3.1; 348/6; 348/192

[58] Field of Search ................................. 348/1, 2, 3, 4, 348/5, 6, 12, 13, 192, 193; 455/3.1, 5.1, 6.1, 4.1, 67.3, 67.4; H04N 7/16, 7/173

[56] References Cited

U.S. PATENT DOCUMENTS

| | | | |
|---|---|---|---|
| 3,624,507 | 11/1971 | Fukata et al. | 325/45 |
| 4,072,899 | 2/1978 | Shimp | 325/67 |
| 4,237,486 | 12/1980 | Shimp | 358/142 |
| 4,700,222 | 10/1987 | Large et al. | 358/86 |
| 5,204,881 | 4/1993 | Cardini et al. | 375/60 |
| 5,465,112 | 11/1995 | Nakao | 348/4 |
| 5,608,428 | 3/1997 | Bush | 348/6 |
| 5,867,206 | 2/1999 | Voght et al. | 348/6 |

OTHER PUBLICATIONS

Article entitled "Characterization of Cable TV Networks as the Transmission Media for Data", by Archer S. Taylor, *IEEE Journal On Selected Areas In Communications*, pp. 255–265, vol. SAC–3, No. 2, Mar. 1985.

*Primary Examiner*—Chris Grant
*Attorney, Agent, or Firm*—Maginot, Addison & Moore

[57] ABSTRACT

An exemplary leakage tagging signal generator according to the present invention is intended for use in connection with a leakage tagging signal detector that detects signal leakage in a communication system. In particular, the leakage tagging signal generator is intended for use with a leakage tagging signal detector that identifies leakage tagging signals based on the detection of a characteristic leakage tagging frequency component. The leakage tagging signal generator includes an RF signal source, an output, a switch, and a pulse signal source. The RF signal source is operable to generate an RF carrier signal having a first frequency. The output connects to the communication system. The pulse signal source is a device operable to generate a pulse signal having a first state and a second state, said pulse signal having a pulse period. The pulse period of the pulse signal includes a first portion in which the pulse signal is in the first state and a second portion in which the pulse signal is in the second state. The pulse period futhermore corresponds to the characteristic tagging frequency. The switch is connected to the pulse signal source. The switch is operable to provide a first discrete signal level of the RF carrier signal to the output responsive to the pulse signal being in the first state, and to provide a second discrete level of the RF carrier signal to the output responsive to the pulse signal being in the second state, thereby producing a pulsed RF signal having the pulse period.

18 Claims, 4 Drawing Sheets

METHOD AND APPARATUS FOR LEAKAGE DETECTION USING PULSED RF TAGGING SIGNAL

FIELD OF THE INVENTION

The present invention relates generally to the field of cable television (CATV) transmission system testing, and in particular, to leakage testing in CATV transmission systems.

BACKGROUND OF THE INVENTION

Cable television systems, or CATV systems, are used in a widespread manner for the transmission and distribution of television signals to end users, or subscribers. In general, CATV systems comprise a transmission subsystem and a distribution subsystem. The transmission subsystem obtains television signals associated with a plurality of CATV channels and generates a broadband CATV signal therefrom. The distribution subsystem then delivers the CATV broadband signal to television receivers located within the residences and business establishments of subscribers.

One problem facing CATV service providers is signal leakage. Signal leakage refers to the unintentional transmission and/or reception of signals through breaches or other nonconformities in the CATV distribution subsystem. In particular, the distribution subsystem, which typically comprises coaxial cable, amplifiers and other devices, ideally provides a relatively low-loss conduit between the CATV transmission subsystem and subscribers' television receivers. If, however, portions of the distribution subsystem are physically damaged, for example, the coaxial cable is damaged, kinked or broken, then CATV signals may leak through the damaged portions, causing unwanted transmission into the atmosphere.

The primary problem associated with the transmission of the CATV signal into the atmosphere via leakage is potential interference with aeronautical communications. Portions of the allocated CATV bandwidth overlap with frequencies allocated for aeronautical communication. Excessive leakage of CATV signals can therefore undesirably interfere with aeronautical-related signal transmission and reception.

As a result, CATV service providers strive to reduce the undesirable phenomenon of signal leakage.

The first step to reducing signal leakage is to determine the location of leakage points in the distribution subsystem. Various leakage detection devices are currently available that assist in the location of leakage points. Such devices typically include an antenna and a receiver that is tuned to a particular frequency in the CATV signal bandwidth. The detector further includes a signal strength measurement circuit. To detect leakage, a technician typically drives along a route that traces a portion of the CATV distribution system, preferably in the vicinity of a suspected leakage location. If the signal strength measurement circuit detects a relatively large amplitude signal at a particular location, then a leak may be indicated in or near that location. The technician may then use the leakage detector to pinpoint the source of the leak. Once the source of the leak is pinpointed, corrective action may be taken.

A drawback of the above described leakage detection devices is their inability to distinguish CATV signals leaked from the system under test from other signals in the same bandwidth. This drawback is becoming of increasing importance due to the proliferation of CATV service providers. In particular, two or more CATV service providers often have portions of their distribution systems that overlap, or at least are disposed in close proximity to one another. As a result, when a technician detects an RF signal in a particular location, the detected RF signal may either have originated from leakage in the system under test or from leakage in another system. Because CATV service providers are primarily interested only in leakage in their own distribution system, it is desirable to ascertain the identity of the source of the leak.

One prior art method of addressing the problem of differentiating the leakage signals from a system under test from other signals is described in U.S. Pat. No. 4,237,486 to Shimp, issued Dec. 2, 1980. Shimp describes a method of modulating an audible tone on an unused CATV channel frequency carrier at the transmission subsystem. The audible tone is sometimes referred to as a tagging signal. The leakage detector, which is tuned to the CATV channel frequency, receives and demodulates the signal. The demodulated signal is audibly amplified. If the audible tone is present, then a significant amount of leakage in the system under test is indicated. If, however, no audible tone is present, then no leakage in the system under test is indicated. Such a system allows the technician to distinguish between detected RF signals originating from leakage in the system under test, which include the audible tone tagging signal, from RF signals originating from extraneous sources, which will not include the audible tone.

One drawback to the above technique is that it relies upon the user's ear to detect the distinctive audible tone. The drawback to such reliance is that if another CATV service provider is transmitting another distinctive audible tone in a closely located but separate CATV network, the user must distinguish between audible tones to determine whether the leakage signal was leaked from the system under test as opposed to the separate CATV network.

Yet another problem is associated with the Shimp device is that it cannot readily distinguish an absolute measure of the quantity of leakage based on the audible tone. While the leakage detector may be moved from location to location to obtain relative readings through detectable increases and decreases in volume, the Shimp device provides no means for obtaining an absolute level.

To overcome the deficiencies of Shimp, leakage detectors have been developed that determine the relative amplitude of the tagging signal (i.e., the modulated tone) with respect to the amplitude of the detected RF signal. Such leakage detectors determine whether the relative amplitude of the tagging signal is consistent with modulation depth of the tagging signal. In particular, prior tagging signal generators typically modulated the RF carrier signal with a substantially pure (or in other words, harmonic free) sinusoidal signal having a known frequency and further having a predetermined depth of modulation. The frequency of the sinusoidal signal is referred to as the tagging frequency. The leakage detector then uses filtering or digital means to determine the relative amplitude of the tagging frequency component of the detected RF signal with respect to the average amplitude of the detected RF signal. The relative amplitude translated directly to the depth of modulation of the generated RF signal.

Consider, for example, a tagging signal generator that generates a 30 Hz sinusoidal tagging signal and modulates the tagging signal onto an RF carrier signal having a frequency of 115 MHz using a 3 dB depth of modulation. Using the 3 dB depth of modulation, it is known that the sinusoidal tagging signal has a relative amplitude of approximately 17% of the average amplitude of the RF carrier signal. The prior art leakage detector described above would obtain the signal content in a signal band centered around 115 MHz, and then demodulate the 115 MHz signal. The prior art leakage detector would then determine the average amplitude of the entire signal, as well as the relative amplitude of the 30 Hz frequency component of the signal. If the relative amplitude of the 30 Hz frequency component is determined to be sufficiently close to 17% of the amplitude of the entire signal, then it was determined that the detected signal originated from leakage in the system under test. If, however, the relative amplitude of the 30 Hz frequency component was significantly less than 17% of the average amplitude of the entire baseband signal, then it was determined that the detected RF signal did not originate from leakage in the system under test.

A leakage detector that operates on this principle is described in U.S. patent application Ser. No. 89/979,104, to Shi et al., filed Nov. 26, 1997, which is assigned to the assignee of the present invention and incorporated herein by reference.

While such systems are effective for leakage detection operation, it is always advantageous to reduce cost in the system, for example, in the leakage tagging generation equipment. One source of cost is the tagging signal generator, which for several reasons is typically a sinusoidal signal source. One reason a sinusoidal signal source has historically been used in the prior art is that tagging signal generators were intended to modulate the tagging frequency signal onto an active television signal. To reduce interference with video reception of that television signal, the tagging frequency signal was chosen to be a low frequency sinusoid that, while detectable by leakage detectors, was filtered out by the input circuitry of many television receivers. If a non-sinusoidal signal is used, then the higher frequency components of the signal tend to increase interference with television reception.

While such systems generate suitable RF tagging signals for leakage detection, there is still a substantial possibility of interference with the video and/or audio content of the received television signal, even with the use of a low frequency sinusoid tagging signal.

A need therefore exists for a tagging signal generator that eliminates the cost associated with generating harmonic-free sinusoidal tagging signals without increasing the interference with television reception.

SUMMARY OF THE INVENTION

The present invention fulfills the above need, as well as others, by providing an RF tagging signal generator that uses a pulsed RF tagging signal on an unused channel frequency. The pulsed RF tagging signal may be generated much more economically than a carrier signal modulated by a substantially pure sine wave. Moreover, the use of an unused channel frequency virtually eliminates the possibility of interference with an active television channel. The pulsed RF tagging signal is configured to have a pulse period that corresponds to a characteristic tagging frequency that is detectable by presently available leakage detectors.

An exemplary leakage tagging signal generator according to the present invention is intended for use in connection with a leakage tagging signal detector that detects signal leakage in a communication system. In particular, the leakage tagging signal generator is intended for use with a leakage tagging signal detector that identifies leakage tagging signals based on the detection of a characteristic leakage tagging frequency component. The leakage tagging signal generator includes an RF signal source, an output, a switch means, and a pulse signal source.

The RF signal source is operable to generate an RF carrier signal having a first frequency. The output connects to the communication system. The pulse signal source is a device operable to generate a pulse signal having a first state and a second state, said pulse signal having a pulse period. The pulse period of the pulse signal includes a first portion in which the pulse signal is in the first state and a second portion in which the pulse signal is in the second state. The pulse period futhermore corresponds to the characteristic tagging frequency. The switch means is connected to the pulse signal source. The switch means is operable to provide a first discrete signal level of the RF carrier signal to the output responsive to the pulse signal being in the first state, and to provide a second discrete level of the RF carrier signal to the output responsive to the pulse signal being in the second state, thereby producing a pulsed RF signal having the pulse period.

The use of a pulsed RF tagging signal, instead of a carrier signal or active television signal modulated by a sinusoidal signal, eliminates the need for a relatively pure sinusoidal signal source. The generation of a suitable pulse signal, such as a square wave signal, may be accomplished much more economically than the generation of a sinusoidal signal. Moreover, the use of an RF carrier signal having a frequency that corresponds to an unused CATV channel frequency substantially eliminates any possibility of interference with CATV subscriber television picture or sound quality.

The above features and advantages, as well as others, will become more readily apparent to those of ordinary skill in the art by reference to the following detailed description and accompanying drawings.

DETAILED DESCRIPTION

Figure 1:
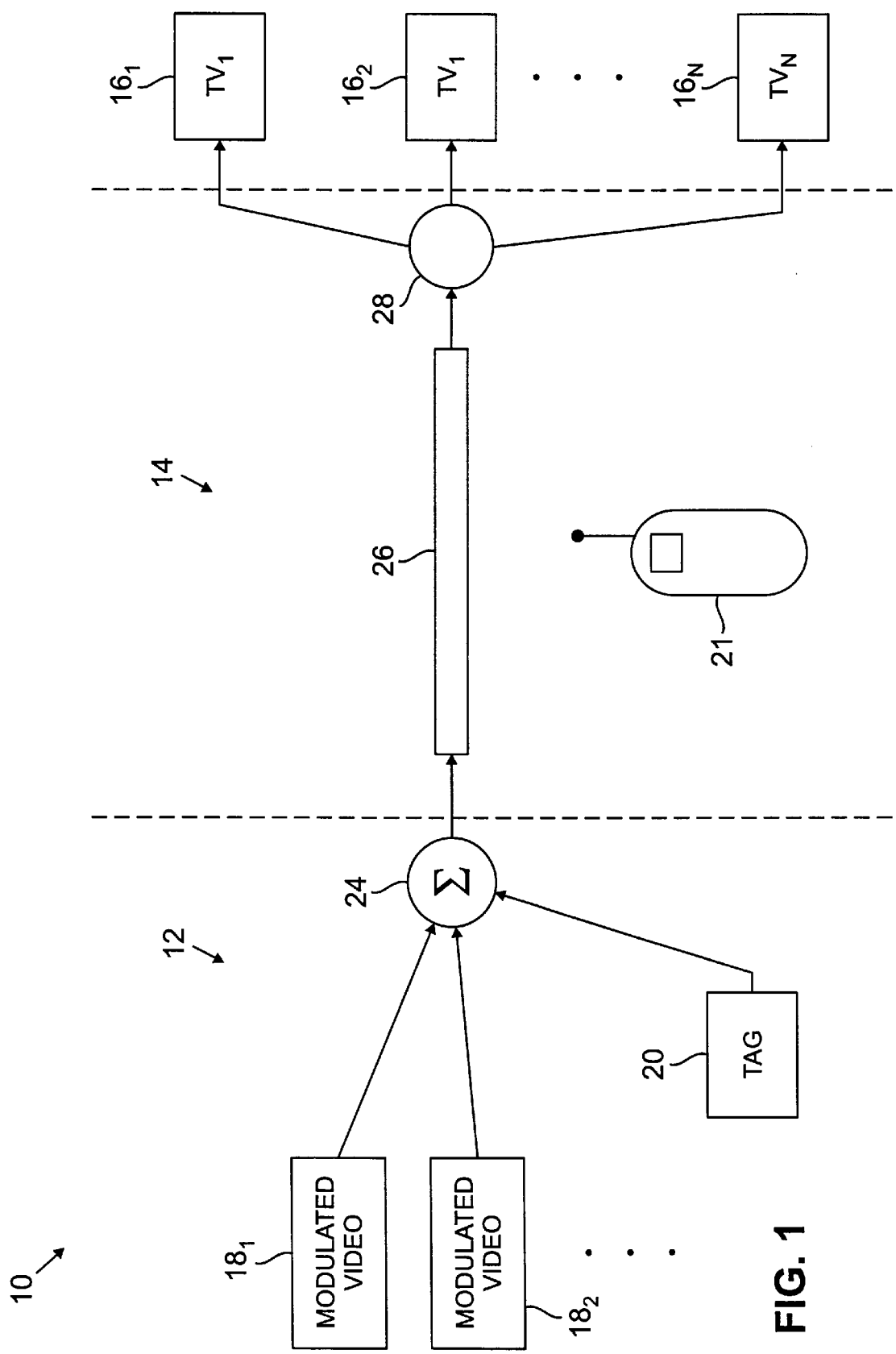
FIG. 1 shows an exemplary communication system arranged for leakage testing in accordance with the present invention.

FIG. 1 shows an exemplary communication system arranged for leakage testing in accordance with the present invention. In the present embodiment, the communication system is a CATV system 10 for transmitting and distributing television signals and other information to subscriber reception devices. The CATV system 10 in this embodiment transmits and distributes television signals in the NTSC standard format, which is well known to those of ordinary skill in the art. The CATV system 10 includes a head end transmission subsystem 12, a distribution subsystem 14, and a plurality of subscriber receivers shown by example herein as television receivers $16_1$, $16_2$, ... $16_N$. Subscriber receivers may alternatively include, among other things, video monitors and computer monitors.

The transmission subsystem 12 includes a plurality of sources of television signals, shown by example herein as modulated video sources $18_1$ and $18_2$, and further includes a radio frequency ("RF") tagging signal generator 20 and a combiner 24. The transmission subsystem 12 is operable to generate a broadband CATV signal as is known in the art, with the exception that a tagging signal is generated and transmitted according to the present invention. In general, a CATV signal as described herein includes, among other things, at least one television signal, the television signal including a baseband television signal modulated onto a carrier signal. Each carrier signal has a frequency associated with one of a plurality of CATV channels.

The modulated video sources $18_1$ and $18_2$ are each circuits well known in the art that include a carrier signal generator, not shown, and a baseband television signal source, not shown. The modulated video sources $18_1$ and $18_2$ are each operable to generate a television signal which comprises a carrier signal modulated by a baseband television signal. Each modulated video source $18_x$ is typically associated with one of a plurality of CATV channels. Specifically, the television signal carrier frequency, or CATV channel frequency, corresponds to an associated CATV channel. The CATV channel frequencies are typically within the 5 MHz to 890 MHz frequency band, and are separated by a predetermined frequency interval. In United States cable systems, the CATV channel frequencies are typically separated by 6 MHz or integer multiples thereof.

The RF tagging signal generator 20 is a circuit that is operable to generate a pulsed RF tagging signal that is detectable by corresponding leakage detecting equipment. In particular, the RF tagging signal generator 20 is intended for use with a corresponding leakage detection device that is operable to identify leakage tagging signals based on the detection of a predetermined characteristic tagging frequency component. For example, the RF tagging signal generator may be used in connection with the Shi et al. device, discussed above.

In particular, the tagging signal generator 20 is operable to generate a pulsed RF signal having an RF carrier frequency and a pulse period. The RF carrier frequency preferably corresponds to an unused CATV channel frequency. The pulse period defines a plurality of harmonic components, including a first harmonic component that corresponds to the characteristic tagging frequency that is detectable by the corresponding leakage detector.

In the preferred embodiment described herein, the tagging signal generator 20 is further operable to provide a pulsed RF tagging signal comprising an RF carrier signal modulated by a pulse signal. The pulse signal preferably has a duty cycle that corresponds to a predetermined modulation depth of the first harmonic component with respect to the RF carrier signal. Such capability permits the corresponding leakage detection equipment to use a relative amplitude measurement of the characteristic tagging frequency component to further verify that the detected RF signal is the pulsed RF signal leaked from the system under test, and not an extraneous signal.

Figure 2:
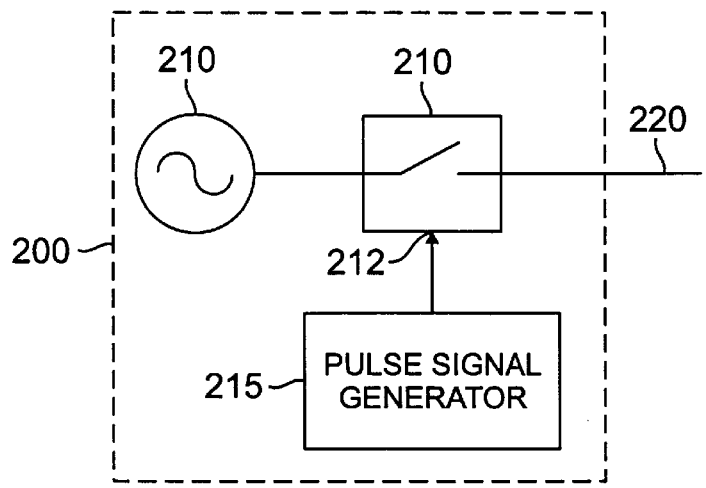
FIG. 2 shows an exemplary tagging signal generator according to the present invention.

FIG. 2, discussed further below, shows an exemplary embodiment of tagging signal generator according to the present invention having the capabilities discussed above.

The modulated video sources $18_1$ and $18_2$ and the RF tagging signal generator 20 are each connected to the signal combiner 24. The signal combiner 24 is operable to combine the television signals generated by the modulated video sources $18_1$ and $18_2$ and the RF tagging signal generated by the RF tagging signal generator 20 into a single broadband signal.

The leakage detecting equipment, shown here by exemplary leakage detector 21, is a circuit operable to detect the pulsed RF tagging signal and determine the relative amplitude of the characteristic tagging frequency component, or in other words, the first harmonic component, of the pulsed RF tagging signal. If the relative amplitude of the characteristic tagging frequency component is within an expected value, then the leakage detector confirms that a detected RF signal at or near the RF carrier frequency originated from leakage in the distribution system 14, and not from some extraneous source. If, however, the relative amplitude of the characteristic tagging frequency component is not within an expected value, then the leakage detector 21 determines that any detected RF signal at or near the RF carrier frequency constitutes a spurious signal of unknown origin or leakage signals of a co-located CATV system.

The combiner 24 is connected to provide CATV signals to the distribution system 14. The distribution system 14 typically comprises a plurality of elements including coaxial cable, repeater amplifiers, splitters and other elements typically employed by CATV service providers. By way of representative illustration only, the distribution system 14 is shown herein as including a cable 26 and a splitter 28. The cable 26 typically comprises a network of coaxial cable or other suitable conduit for transmission of CATV signals through a geographical area interspersed with subscribers.

In the example discussed herein, the cable 26 connects the combiner 24 to the splitter 28. The splitter 28 is then connected to the plurality of television receivers $16_1 \ldots 16_N$. The television receivers $16_1 \ldots 16_N$ are, in general, commercially available television receivers designed or adapted to receive CATV signals and tune to particular channels within the CATV signal. While the performance of various types of televisions differ somewhat, substantially all commercially available televisions are designed to include tuning and filtering equipment having a minimum standard performance criteria.

Regardless of the particular make-up, the distribution system 14 is susceptible to faults, cable breaches, faulty interconnections, and other nonconformities that allow leakage. Leakage includes the egress of CATV signals from the distribution system 14 into the atmosphere. The egress of the CATV signal out of the distribution system 14 can potentially interfere with aeronautical communication.

The tagging signal generator 20 of the present invention generates a unique tagging signal that facilitates the detection of such leaks. An exemplary operation of the tagging signal generating method and apparatus within the CATV system 10 is discussed herebelow.

In general, the plurality of the modulated video sources $18_1$ and $18_2$ each generate television signals associated with one of a plurality of CATV channels. Contemporaneously, the tagging signal generator 20 generates a pulsed RF tagging signal. To this end, the tagging signal generator 20 generates a pulsed RF tagging signal wherein the pulsed RF tagging signal has a first discrete signal level, a second discrete signal level that is substantially less than the first discrete signal level, an RF carrier frequency, and a pulse period. The pulse period defines a first harmonic component that corresponds to the characteristic tagging frequency that is detectable by the corresponding leakage tagging signal detector. The tagging signal generator 20 furthermore provides the pulsed RF tagging signal to the combiner 24.

The combiner 24 then combines the pulsed RF tagging signal with the television signals from the modulated video sources $18_1$ and $18_2$ to produce a broadband CATV signal for transmission. The combiner 24 provides the broadband CATV signal to the cable 26.

The CATV signal traverses the cable 26 to the splitter 28. The splitter 28 then distributes the CATV signal to each of the television receivers 16$_1$ ... 16$_N$. One or more of the television receivers 16$_1$ ... 16$_N$ tunes to a select CATV channel and performs the appropriate signal processing to provide a visible and audible presentation of the program information.

The pulsed RF tagging signal does not significantly interfere, nor perceptively interfere, with the visible and audible presentation of the program information of any television signal because the RF carrier signal frequency is chosen to correspond to an unused CATV channel frequency.

While the pulsed RF tagging signal does not interfere with television audio and video content received by the end user, the leakage detector 21 readily detects the pulsed RF tagging signal if the leakage detector is both located in the vicinity of leakage in the distribution system 14, and tuned to the RF carrier frequency. In leakage detection operation, a field technician moves the leakage detector 21 along various portions of the distribution system 14 to attempt to identify sources of leakage.

If the leakage detector 21 detects sufficient signal energy within an RF frequency band that includes the RF carrier frequency, and further confirms that the relative amplitude of the characteristic tagging frequency component of the detected signal energy is within an expected range, then the technician may determine the existence and location of a leakage situation in the distribution system 14.

Accordingly, the present invention, like other leakage tagging arrangements, utilizes a characteristic tagging frequency component to allow the leakage detector to discriminate between signals caused by leakage in the CATV system under test and spurious signals in the same frequency band. However, in contrast to the prior art, in which the characteristic tagging frequency component comprised a sinusoidal signal having the characteristic frequency, the present invention provides a leakage tagging generator that requires only a pulse signal, such as a square wave signal.

More particularly, in contrast to the prior art, the leakage tagging signal generator according to the present invention operates with pulsed RF tagging signal that has a first signal level and a second signal level, wherein the second signal level is substantially less than the first signal level. The generation of pulsed RF tagging signals having only two discrete signal levels is much easier and less expensive than generating RF signals modulated by a sinusoidal signal, which have continuously and precisely varing signal levels.

FIG. 2 shows a tagging signal generator 200 according to the present invention. The tagging signal generator includes an RF signal source 205, a switching means 210, and a pulse generator 215 and an output 220. The RF signal source 205 is any RF source operable to generate an RF carrier signal having a frequency in the CATV bandwidth. To accommodate current industry standards, which require that leakage detection measurements be carried out between approximately 115 MHz and 140 MHz, the RF signal source 205 is preferable operable to generate an RF carrier signal on an unused CATV channel frequency between approximately 115 MHz and 140 MHz. The pulse signal generator 215 is any circuit operable to generate a pulse signal having first and second states, and further having a pulse period that corresponds to the characteristic tagging frequency that is detectable by the corresponding leakage detector. Specifically, the pulse period is equal to the inverse of the characteristic tagging frequency. Each pulse period comprises a first portion in which the pulse signal is in the first state and a second portion in which the pulse signal is in the second state.

The switching means 210 includes a control input 212 for receiving the pulse signal. To this end, the control input 212 is operably connected to the pulse signal generator 215. The switching means 210 is any device operable to controllably and alternately provide first and second discrete signal levels of the RF carrier signal to the output 220 responsive to the pulse signal. In particular, the switching means 210 is operable to cause a first discrete signal level of the RF signal generated by the RF signal source 205 to be provided at the output 220 while the pulse signal is in a first state, and to cause a second discrete level of the RF signal to be provided to the output 220 while the pulse signal is in the second state.

The switching means 210 may therefore suitably be an RF switch, a variable attenuator, or a variable gain oscillator, any of which are operable to controllably provide two discrete levels of the RF signal generated by the RF signal source 205 at the output 220 responsive to a pulse signal having first and second states.

The use of the term pulse signal as defined herein is a signal that includes a plurality of harmonics, or in other words, is not a substantially harmonic-free sinusoid signal. The use of such a pulse signal in the present invention eliminates the need for costly sinusoid signal generation equipment. In the exemplary embodiment described herein, the pulse signal generator 215 is a square wave signal generator, which may suitable include a microprocessor.

Figure 3:
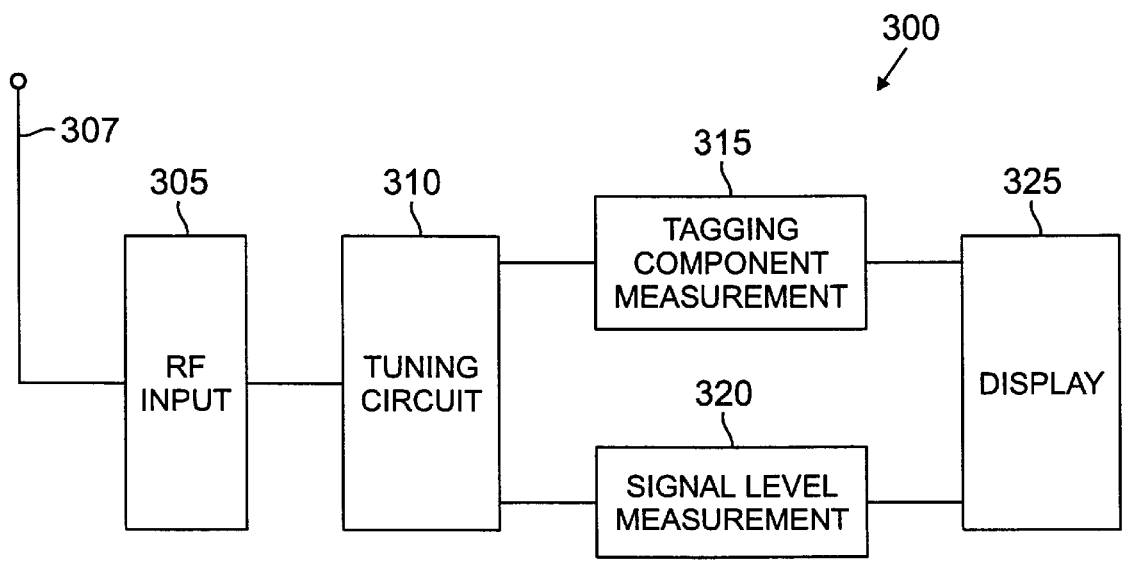
FIG. 3 shows a prior art leakage detector which may be used in connection with the tagging signal generator of FIG. 2 to perform leakage detection in accordance with the present invention.

FIG. 3 shows a leakage detector 300 for use in connection with the tagging signal generator according to the present invention. The leakage detector has an RF input 305, a tuning circuit 310, a tagging signal component measurement circuit 315, a level detector circuit 320, and a display 325. The leakage detector 300 in FIG. 3 is shown as high level functional blocks. Those of ordinary skill in the art may readily implement the necessary circuits to carry out the functions ascribed to the various functional blocks of FIG. 3. Further details of such a leakage detector may be found in the Shi et al. patent application, discussed above.

The RF input 305 includes an antenna 307 and is operable to detect airborne broadband RF signals including a first RF signal in a first signal bandwidth centered around the frequency of the RF carrier signal generated by the RF signal source 205 of FIG. 2. The first RF signal may in some cases be the pulsed RF tagging signal generated by the RF source 205 of FIG. 2, and in other cases be a combination of one or more spurious signals from other sources.

The tuning circuit 310 is a circuit operable to receive broadband RF signals and generate an intermediate frequency ("IF") signal comprising the first RF signal converted to be centered around an intermediate frequency. To this end, the tuning circuit 310 effectively down-converts the broadband RF signals by an amount defined by FCW-IF, wherein FCW is the frequency of the RF carrier signal generated by the RF signal source 205 of FIG. 2. The tuning circuit 310 furthermore effective provides filtering such that substantially only the down-converted first RF signal remains.

The tagging frequency component measurement circuit 315 is a circuit operable to obtain a measurement of relative amplitude of a tagging frequency component with respect to an average amplitude of the first RF signal. Thus, if the first RF signal has a tagging frequency component at 30 Hz which has an amplitude of 34 mV RMS, and the average amplitude of the first RF signal is 200 mV RMS, then the tagging frequency component measurement circuit is operable to generate a measurement representative of 34/200, or 0.17.

To this end, the tagging frequency component measurement circuit 315 includes circuitry that demodulates the IF signal to produce a baseband signal. The baseband signal represents the first RF signal with the RF carrier frequency removed. The tagging frequency component measurement circuit 315 then correlates the baseband signal to a sinusoid signal having the characteristic tagging signal. The tagging frequency component measurement circuit further determines the average amplitude of the baseband signal. The correlation results and the baseband average amplitude provide a measure of the relative amplitude of the tagging frequency component with respect to the first RF signal.

Further description of a tagging frequency component measurement circuit that operates using the correlation method as described above may be found in Shi et al., discussed above. In alternative circuits, a narrow band filter may be used to obtain the relative tagging frequency component of the first RF signal.

The level measurement circuit 320 is a circuit operable to generate a signal level measurement of the IF signal. The signal level measurement circuit 320 is operable to provide the signal level measurement information to the display.

The display circuit 325 is a visible display that is operable to display the signal level measurement, and also to display whether the relative amplitude of the tagging frequency component as measured by the tagging frequency component measurement circuit 315 is within a tolerable window of an expected value. The expected value of the relative amplitude of the tagging frequency component is the value that corresponds to the depth of modulation of the tagging frequency component onto the RF carrier signal as generated by the tagging signal generator 200. Thus, in systems using prior art leakage tagging generators, the expected value would correspond to the depth of modulation of the sinusoidal tagging signal onto the RF carrier signal. In accordance with the present invention, however, the expected value corresponds to the effective depth of modulation of the tagging frequency component which is defined by the pulse duty cycle of the pulsed RF tagging signal. The relationship between the pulse duty cycle of the pulsed RF tagging signal and the effective modulation depth of the tagging frequency component is discussed further below in connection with FIG. 4.

In any event, the display 325 is not only operable to provide a visible indication of the strength of first RF signal, which is representative of all RF energy detected in a signal band centered at the RF carrier frequency, but is further operable to provide a visible indication as to whether that RF energy is primarily composed of the pulsed RF tagging signal, and thus is due to leakage in the system under test, or is primarily composed of spurious signals not arising from leakage.

Reference is made to both FIGS. 2 and 3 in the discussion of the operation of the leakage tagging signal generator 200 of FIG. 2 and the corresponding frequency correlation leakage detector of FIG. 3. As an initial matter, the output 220 is connected to a first end of a system under test and the leakage detector 300 is moved about the distribution network of the system under test in order to detect leaks therein. The leakage tagging signal generator 200 and the leakage detector 300 may suitably be arranged in a manner similar to the leakage tagging signal generator 20 and the leakage detector 21 of FIG. 1.

The RF source 205 first generates a pulsed RF tagging signal which may suitably be an RF carrier signal having an RF frequency within the CATV bandwidth. Preferably, the RF source 205 generates an RF carrier signal having a frequency that corresponds to an unused CATV channel frequency of between 115 MHz and 140 MHz.

The pulse signal generator 215 generates a pulse signal having a pulse period, the pulse period having a first portion in which the pulse signal is in a first state and a second portion in which the pulse signal is in a second state. The pulse signal is considered to be in the first or second state depending on whether it exceeds a particular threshold frequency. Thus, if the pulse signal is a square wave signal, the threshold frequency may suitably set to be between the on and off voltage levels of the square wave signal.

The pulse period further corresponds to the characteristic tagging frequency that is detectable by a corresponding leakage detector, such as the leakage detector of FIG. 3. In particular, the pulse period is equal to the inverse of the characteristic tagging frequency. For example, if the selected tagging frequency is 30 Hz, then the pulse period would be 1/F or 0.033.

The pulse signal generator 215 provides the pulse signal to the control input 212 of the switch means 210. The switch means 210 alternately provides and removes the RF carrier signal to and from, respectively, the output 220 responsive to the pulse signal. In particular, when the pulse signal is in the first state, the switch means 210 provides a first discrete signal level of the RF carrier signal to the output 220. When the pulse signal is in the second state, the switch means 210 provides a second discrete signal level of the RF carrier signal to the output 220, wherein the second discrete signal level is essentially zero.

The resultant output signal, or pulsed RF tagging signal, consists of a pulsed RF signal that appears as an RF signal modulated by a square wave. It is noted that the RF signal pulses have a period defined by the pulse period of the pulse signal. The duty cycle of the of the pulsed RF tagging signal is defined by the percentage of pulse period in which the pulse signal is in the first state. The ratio of the pulse period in which the pulse signal is in the first state, or the pulse duty cycle, is selected to correspond to a predetermined depth of modulation expected by the corresponding leakage detector.

Figure 4:
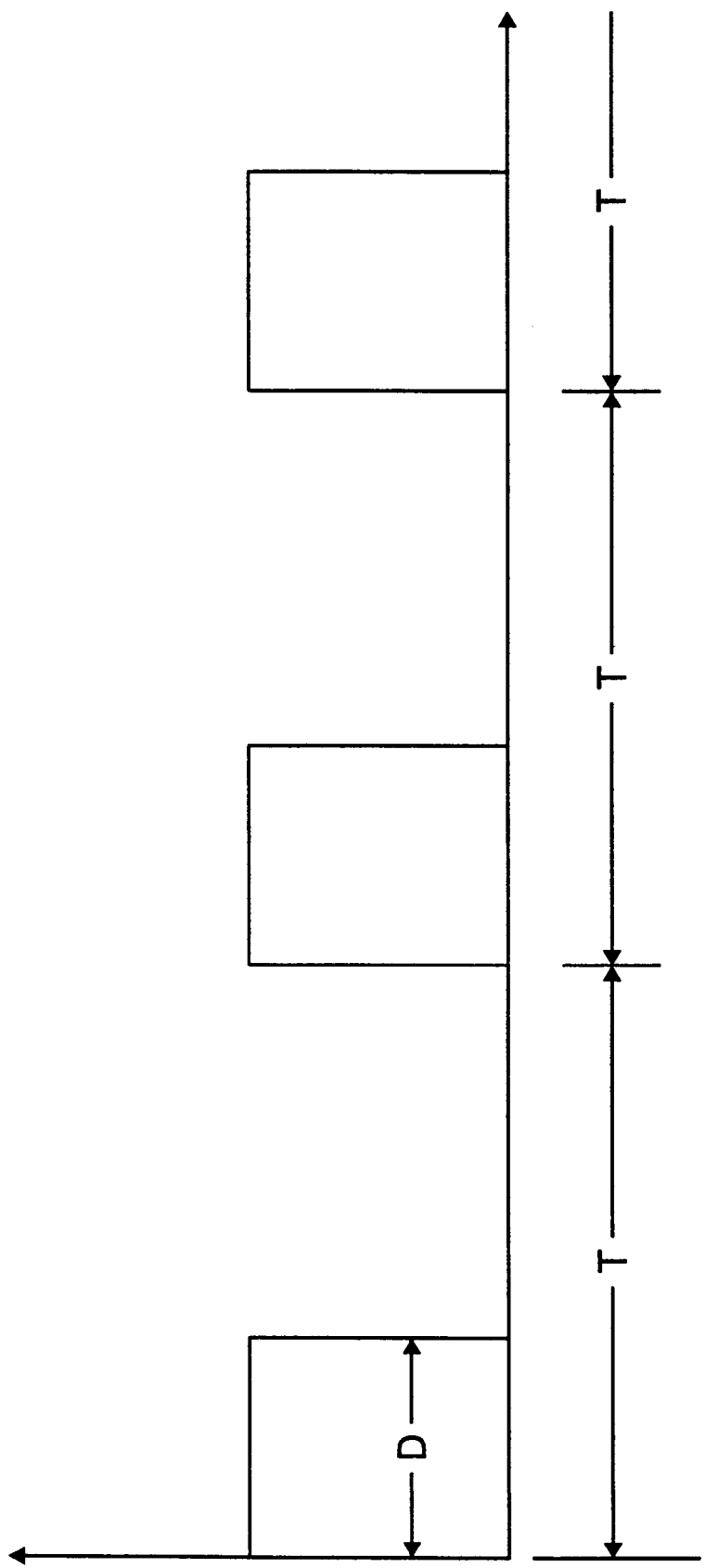
FIG. 4 shows a timing diagram of an exemplary pulsed RF tagging signal generated in accordance with the present invention.

In particular, the pulse duty cycle may be controlled such that the modulation depth of the first harmonic component is a predetermined level. FIG. 4 shows a timing diagram of a pulsed RF tagging signal as generated by the tagging signal generator 200 of the present invention. In FIG. 4, D represents the duration in which the pulse signal is in the first state, T represents the pulse period, and A represents the RF signal amplitude. The amplitude of the first harmonic is given by the following equation:

$$\frac{A\sin[(D/T)\pi]}{(D/T)\pi} = FH$$

where FH is the first harmonic amplitude. Because depth of modulation is a measure of a modulated signal amplitude with respect to the carrier wave signal, the depth of modu lation DMFH of the first harmonic is equal to FH/A. Thus, the depth of modulation of the first harmonic is given by the following equation:

$$DMFH = \frac{\sin[(D/T)\pi]}{(D/T)\pi}$$

Thus, to set the pulse duty cycle for a predetermined depth of modulation, the desired DMFH is inserted into the above equation, and then the equation is solved for D/T, which is the pulse duty cycle. The pulse signal generator 215 may then be configured to provide the appropriate duty cycle.

In this manner, the leakage tagging signal generator 200 may provide a depth of modulation that corresponds to a depth of modulation expected by a suitable leakage detector. In the exemplary embodiment described herein, the leakage detector 300 is configured to detect a tagging signal with a 3 dB depth of modulation of the tagging frequency component. Accordingly, D/T is selected to provide a DMFH that corresponds to 3 dB, or DMFH=0.17. When the above equation is solved for a DMFH value of 0.17, the pulse duty cycle D/T is equal to 0.92. Thus, a pulsed RF tagging signal having an "on" duty cycle of 0.92 will provide a depth of modulation of the 1/T frequency component of 3 dB.

The output 220 of the tagging signal generator 200 provides the pulsed RF tagging signal to the distribution network of the system under test, not shown. In the exemplary operation described herein, it is assumed that the leakage detector 300 is located near a leakage point in the system under test.

The RF input 305 receives broadband RF signals through the antenna 307. The received RF signals include a first RF signal in a first signal bandwidth. In the exemplary operation described herein, because the leakage detector is located near a leakage point, the first RF signal will comprise the pulsed RF tagging signal leaked from the system under test. The RF input 305 and tuning circuit 310 cooperate to provide an IF signal that comprises a frequency converted version of the pulsed RF tagging signal. The tuning circuit 310 provides the pulsed RF tagging signal to each of the tagging frequency component measurement circuit 315 and the signal level measurement circuit 320.

The tagging frequency component measurement circuit 315 then generates an output signal representative of the relative amplitude of the tagging frequency component with respect to the average amplitude of the RF carrier signal. In the exemplary operation described herein, the tagging frequency component measurement circuit 315 generates an output signal of approximately 0.17, which is the relative amplitude value that corresponds to the pulse duty cycle generated by the pulse signal generator 215 of FIG. 2.

The level measurement circuit 320 contemporaneously generates an output representative of the signal level of the IF signal. The level measurement circuit 320 then provides the output to the display 325. The display 325 provides a visible display of the signal level. The display 325 further receives the output signal from the tagging frequency component circuit 315 and provides a visible annunciator indicating whether the output signal corresponds to the expected value as defined by the duty cycle of the pulsed RF tagging signal. The expected value in the exemplary embodiment is 0.17, which corresponds to an effective modulation depth of 3 dB of the tagging frequency component, which in turn corresponds to a pulse duty cycle of 0.92.

Accordingly, in the exemplary operation described herein, the display 325 provides a visible indication that the measured relative amplitude of the tagging frequency component is within an acceptable range of the expected value.

If, however, the leakage detector 300 were not located in close proximity to a leak, but another source was generating RF energy having frequency components at the frequency of the RF carrier signal, then little or no tagging frequency component will be detected, and the display 325 would provide an indicator communicating that the relative amplitude of tagging frequency component was not within an acceptable range of the expected value.

Accordingly, the tagging signal generator 200 of the present invention is capable of providing a tagging signal having a tagging signal component that is detectable by a corresponding leakage detector without using a sinusoidal tagging signal. Instead, the tagging signal generator of the present invention simply pulse modulates an RF carrier signal using a generated a pulse signal, such as a square wave, which can be accomplished far more economically than a pure sinusoid. The resulting tagging signal generator is thus more economical than the prior art tagging signal generation equipment while remaining compatible with existing leakage detection equipment that determines both the presence and the relative strength of a characteristic tagging frequency component.

Figure 5:
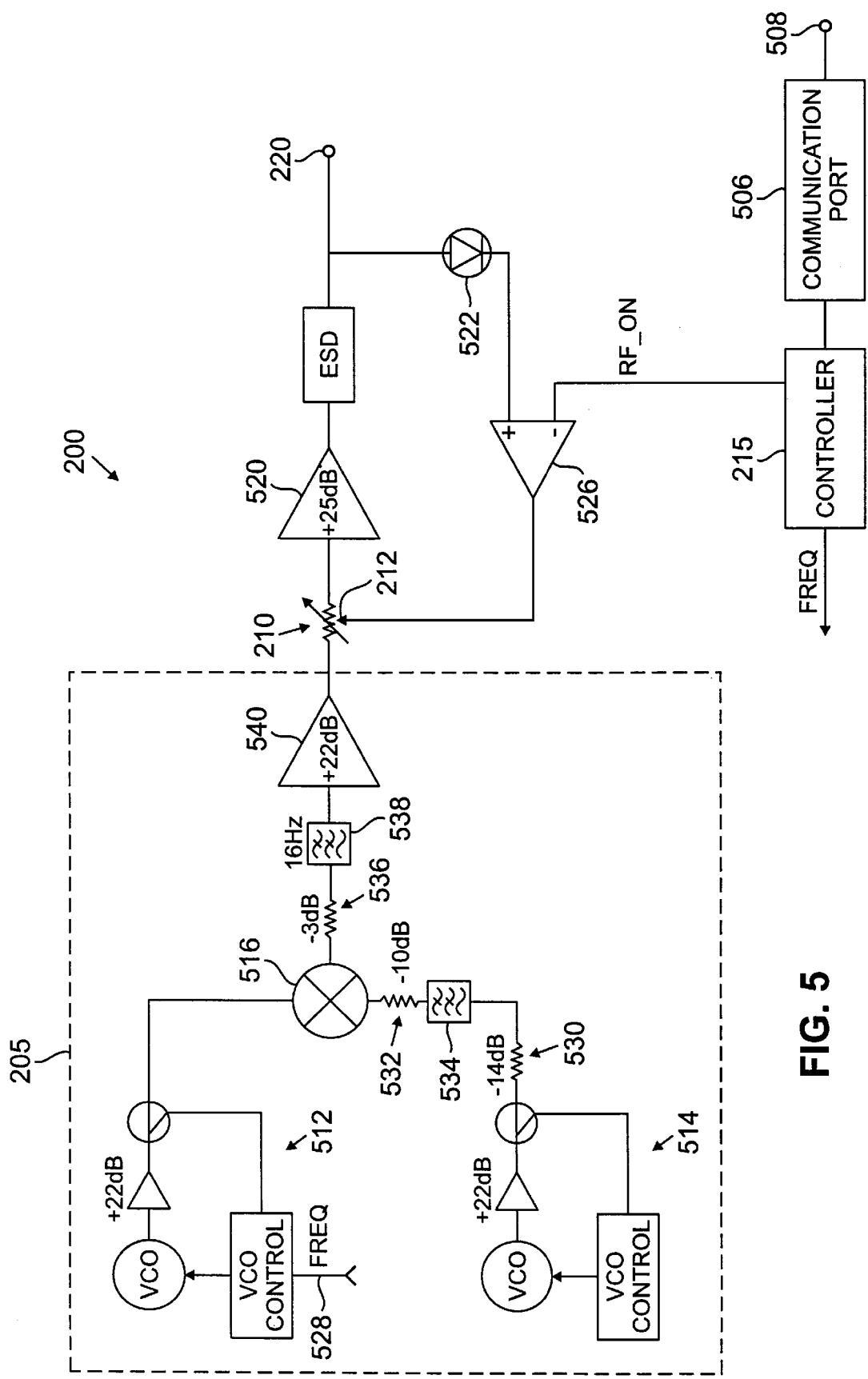
FIG. 5 shows in further detail an exemplary embodiment of the tagging signal generator of FIG. 2.

FIG. 5 shows in further detail an exemplary embodiment of a tagging signal generator 200 according to the present invention. For purposes of clarity, the same reference numbers are used to identify like components in FIGS. 2 and 5. As discussed above in connection with FIG. 2, the tagging signal generator 200 includes an RF source 205, a switch means comprising a variable attenuator 210, a pulse signal generator comprising a controller 215, and an output 220. The tagging signal generator 200 further includes a communication port 506 and an auxiliary input 508.

The RF source 205 includes a first oscillator circuit 512, a second oscillator circuit 514, a mixer 516, an output attenuator 536, a one gigahertz low pass filter 538, and a +22 dB amplifier 540.

The first oscillator circuit 512 is a tunable oscillator circuit operable to provide RF signals over a range of frequencies, for example, from 1655 MHz to 2450 MHz. Specifically, the first oscillator circuit 512 has a control frequency input 528 connected to the controller for receiving frequency control signals therefrom. The first oscillator circuit 512 generates output RF signals having a frequency that corresponds to frequency control signals received at the control frequency input 528. To this end, the first oscillator circuit 512 also includes a voltage controlled oscillator ("VCO") and a VCO control circuit configured in a well-known manner to produce frequency-controlled RF signals.

The second oscillator circuit 514 is an oscillator circuit operable to produce an RF signal having a fixed reference frequency. In the embodiment described herein, the second oscillator circuit 514 produces a reference frequency of 1650 MHz. The second oscillator circuit 514 may suitably have the same structure as the first oscillator circuit 512.

The mixer 516 is operably coupled to receive RF signals from the first oscillator circuit 512 and the second oscillator circuit 514 and to generate a mixed RF signal therefrom. The mixed RF signal, or output signal, is at the RF carrier frequency, which preferably corresponds to an unused CATV channel frequency. In the exemplary embodiment described herein, the mixer 516 is coupled to the second oscillator circuit 514 through first and second reference signal attenuators 530 and 532, respectively, and a low pass filter 534. The mixer 516 is coupled to provide the output signal to variable attenuator 518 through the output attenuator 536, the one gigahertz low pass filter 538, and the +22 dB amplifier 540.

The variable attenuator 210 is operable to attenuate the output signal in order to provide a level-adjusted output signal to an output amplifier 520. To this end, the variable attenuator 210 may suitably be PIN diode variable attenuator. The output amplifier 520 is preferably a +25 dB amplifier, and is further connected to provide an amplified output signal to the output 220 and a feedback detector 522.

The feedback detector 522 is operable to receive the amplified output signal and generate a feedback signal having a DC level indicative of the amplified output signal magnitude. The feedback detector 522 is coupled to provide the feedback signal to a control loop amplifier 526. The control loop amplifier 526 is further coupled to the controller 215 to receive a reference signal RF_ON, which may suitably be the pulse signal, therefrom. The control loop amplifier 526 is operable to provide an error signal to the control input of the variable attenuator 210, wherein the error signal is based on the difference between the DC level of RF_ON and the feedback signal.

The communication port 506 is connected between the controller 215 and the auxiliary input 508. The communication port 506 is a circuit operable to communicate signals, such as those containing information identifying the RF carrier signal frequency of the pulsed RF tagging signal, and the characteristic tagging frequency, directly from an external programming device, not shown. Alternatively, such information may be provided to the controller 215 through a keyboard input device.

The controller 215 is a microprocessor circuit or the like that includes memory, not shown, for storing program instructions and data. The controller 215 is operable to generate a pulse signal such as that described above in connection with FIG. 2. In particular, in the exemplary embodiment described herein, the controller 215 is operable to generate a square wave signal having a pulse period that corresponds to the characteristic tagging frequency and a pulse duty cycle that corresponds to a predetermined depth of modulation. The controller 215 is further operable to generally control the operations of the tagging signal generator 500 as described herebelow. Those of ordinary skill in the art may devise a suitable controller circuit.

In operation, the tagging signal generator 200 is first connected to a programming device through the auxiliary input 508. The communication port 506 then receives the RF carrier signal frequency information and the characteristic tagging signal frequency information from the programming device. The RF carrier signal frequency, as discussed above, is preferably between approximately 115 MHz and 140 MHz, but in any event is chosen to be compatible with the RF receiving circuitry of the corresponding leakage detector. The characteristic tagging frequency is typically dictated by the corresponding leakage detection device, and is often a low frequency such as 30 Hz or below. The RF carrier signal frequency and the characteristic tagging frequency information is then provided to the controller 215, which stores the information in the memory associated therewith.

The tagging signal generator 200 is then connected to the system under test, if not already so connected. To this end, the output 220 is connected to a terminal point of the system under test.

The controller 215 then provides a frequency control signal that corresponds to the RF carrier signal frequency to the frequency control input 528 of the first oscillator circuit 512. The frequency control signal is a signal that causes the first oscillator circuit 512 to produce an RF signal having a frequency of the RF carrier signal frequency +1650 MHz. The RF signal is provided to the mixer 516.

The second oscillator circuit 514, meanwhile, generates a fixed reference frequency RF signal having a frequency of 1650 MHz. The fixed reference frequency signal is also provided to the mixer 516 through the attenuators 530 and 532 and the low pass filter 534.

The mixer 516 receives the RF signals from each of the first and second oscillator circuits 512 and 514, respectively, and generates an output signal therefrom. The output signal is the RF carrier signal. The RF carrier signal is then provided to the variable attenuator 210. The variable attenuator 210 then provides attenuation to the RF carrier signal responsive to the pulse signal received at its control input 212.

The controller 215 contemporaneously provides a pulse signal to the to the control loop amplifier 526. The pulse signal comprises first and second states, and includes a pulse period. In the exemplary embodiment described herein, the pulse signal is a square wave signal, wherein the first and second states are the "on" and "off" portions of the square wave signal. In general, when pulse signal is in the first state, the control loop amplifier 526 generates a signal that causes the variable attenuator 210 to provide a low level of attenuation, essentially allowing the RF carrier signal to propagate through the output amplifier 520 to the output 220. When the pulse signal is in the second stage, the control loop amplifier 526 generates a signal that causes the variable attenuator 210 to provide a high level of attenuation, essentially preventing the RF carrier signal from propagating to the output 220. Accordingly, the variable attenuator 210 generates a pulsed RF tagging signal responsive to the pulse signal.

In particular, the controller 215 generates the pulse signal in the first state by providing a reference voltage level to the control loop amplifier 526. Responsive to the reference voltage level, the control loop amplifier 526 first causes the variable attenuator 210 to provide the RF carrier signal to the output 210. While the pulse signal remains in the first state, the feedback detector 522 and the control loop amplifier 526 operate as a feedback path used to provide a high degree of control over the level of the pulsed RF tagging signal. In particular, the feedback detector 522 generates a feedback signal having a DC level proportional to the amplitude or power of the RF carrier signal. The control loop amplifier 526 receives the feedback signal from the feedback detector 522, and furthermore continues to receive the reference voltage level from the controller 210. The control loop amplifier 526 compares the feedback signal to the reference voltage level and generates an error signal therefrom. The control loop amplifier 526 provides the error signal to the control input 212 of the variable attenuator 210. During ordinary operation, the error signal constitutes a measure of the drift of the magnitude of the RF carrier signal from the desired output level.

The controller 215 continues to provide the reference voltage level to the control loop amplifier 526 for the predetermined duty cycle. As discussed above in connection with FIGS. 2 and 4, the duty cycle is derived from the expected depth of modulation of the characteristic tagging frequency and the pulse period. Further, the pulse period is defined as the inverse of the characteristic tagging frequency.

In any event, after the controller 215 provides the reference voltage level for an entire duty cycle, the controller 215 provides a turn-off voltage level to the control loop amplifier 526 for the remainder of the pulse period. Responsive to the turn-off voltage level, the control loop amplifier 526 cause the variable attenuator 210 to provide the high level of attenuation, effectively turning off the RF carrier signal at the output 220.

The controller 215 provides the pulse signal in an ongoing manner, switching between the reference voltage level in the first state and the turn-off voltage level in the second state for a substantial plurality of pulse periods.

It will be noted that the above described embodiments of the present invention are merely illustrative. Those of ordinary skill in the art may readily devise their own implementations that incorporate the principles of the present invention and fall within the spirit and scope thereof. For example, the use of a pulsed RF tagging signal in which the second signal discrete level is essentially zero is given by way of example only. In alternative embodiments, the second discrete signal level may be greater than zero, although still less than the first discrete signal levels. In such an embodiment, an adjustment would have to be made to the pulse duty cycle to ensure the proper effective depth of modulation of the characteristic tagging frequency component. Those of ordinary skill in the art may readily determine the appropriate adjustment of the pulse duty cycle to accommodate a pulsed RF tagging signal having a non-zero second discrete signal level.

We claim:

1. A method transmitting a tagging signal in a communication system to a leakage tagging signal detector, said leakage tagging signal detector operable to identify leakage tagging signals based on the detection of a predetermined characteristic tagging frequency component, comprising:

a) generating a pulsed RF signal, the pulsed RF signal having a first discrete signal level, a second discrete signal level which is substantially less than the first discrete signal level, an RF carrier frequency, and a pulse period, wherein said pulse period defines a first harmonic component that corresponds to the characteristic tagging frequency; and b) providing the pulsed RF signal to the communication system to facilitate a leakage measurement.

2. The method of claim 1 wherein step a) further comprises generating a pulsed RF signal by modulating an RF carrier signal having the RF frequency with a pulse signal having first and second states, and wherein the RF signal has the first discrete signal level when the pulse signal is in the first state and the RF signal has the second discrete signal level when the pulse signal is in the second state.

3. The method of claim 1 wherein step a) further comprises generating the pulsed RF signal such that the pulsed RF signal has a duty cycle that corresponds to a predetermined modulation depth of the first harmonic component with respect to the RF carrier signal.

4. The method of claim 2 wherein step a) further comprises generating a pulse signal comprising a square wave signal.

5. The method of claim 4 wherein step a) further comprises employing a microprocessor to generate the square wave signal.

6. The method of claim 1 wherein step a) further comprises generating the pulsed RF signal wherein the pulsed RF signal has an RF carrier frequency of between approximately 115 MHz and approximately 140 MHz.

7. The method of claim 6 wherein step a) further comprises generating the pulse RF signal wherein the pulsed RF signal has an RF carrier frequency that corresponds to an unused CATV channel frequency.

8. The method of claim 1 wherein step a) further comprises generating the pulse RF signal wherein the pulsed RF signal has an RF carrier frequency that corresponds to an unused CATV channel frequency.

9. The method of claim 1 wherein step a) further comprises generating the pulsed RF signal such that the second discrete signal level is substantially zero.

10. A leakage tagging signal generator for use in connection with a leakage tagging signal detector for detecting signal leakage in a communication system, said leakage tagging signal detector operable to identify leakage tagging signals based on the detection of a characteristic leakage tagging frequency component, the leakage tagging signal generator comprising:

a) an RF signal source operable to generate an RF carrier signal having a first frequency;

b) an output for connecting to the communication system;

c) a pulse signal source operable to generate a pulse signal having a first state and a second state, said pulse signal having a pulse period, the pulse period including a first portion in which the pulse signal is in the first state and a second portion in which the pulse signal is in the second state, the pulse period corresponding to the characteristic tagging frequency; and d) a means, connected to the pulse signal source, for providing the RF carrier signal to the output responsive to the pulse signal being in the first state and removing the RF carrier signal to the output responsive to the pulse signal being in the second state, thereby producing a pulsed RF signal having the pulse period.

11. The leakage tagging signal generator of claim 10 wherein the pulse signal source is further operable to generate the pulse signal in which the pulse signal is a square wave signal.

12. The leakage tagging signal generator of claim 11 wherein the pulse signal source is further operable to generate the pulse signal wherein the pulse signal has a duty cycle defined by the first portion of the pulse period, the duty cycle corresponding to a predetermined modulation depth of a first harmonic component of the pulsed RF output signal.

13. The leakage tagging signal generator of claim 10 wherein the RF signal source is further operable to generate the RF carrier signal wherein the RF carrier signal has a first frequency that corresponds to an unused CATV channel.

14. The leakage tagging signal generator of claim 13 wherein the RF signal source is further operable to generate the RF carrier signal wherein the RF carrier signal has a first frequency between approximately 115 MHz and approximately 140 MHz.

15. The leakage tagging signal generator of claim 10 wherein the RF signal source is further operable to generate the RF carrier signal wherein the RF carrier signal has a first frequency that corresponds to an unused CATV channel.

16. The leakage tagging signal generator of claim 10 wherein the pulse signal source includes a microprocessor.

17. The leakage tagging signal generator of claim 10 wherein the means for providing comprises an RF switch.

18. The leakage tagging signal generator of claim 10 wherein the means for providing comprises a variable attenuator.

* * * * *